Aug. 25, 1931. E. E. HEWITT 1,820,020
PIPE COUPLING
Filed Nov. 26, 1928

INVENTOR
ELLIS E. HEWITT
BY
ATTORNEY

Patented Aug. 25, 1931

1,820,020

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

PIPE COUPLING

Application filed November 26, 1928. Serial No. 321,832.

This invention relates to pipe couplings and more particularly to couplings of the type by which various sizes of pipes may be coupled to the conduits of engines or other kinds of machines and devices.

An object of the invention is to provide means by which various types and sizes of pipes may be coupled to a conduit or passage to form a fluid tight joint.

Another object of the invention is to provide an interchangeable pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
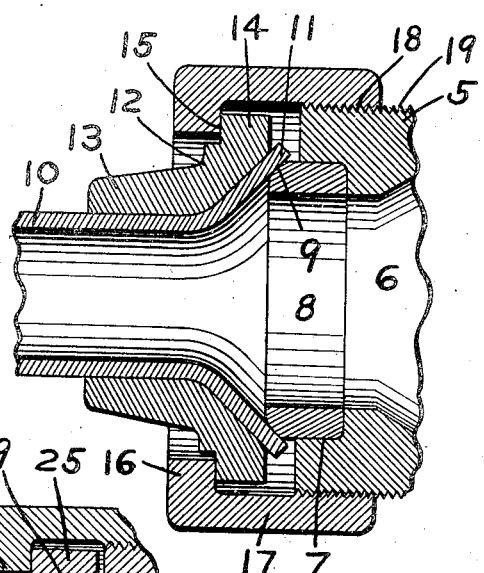
Figure 2:
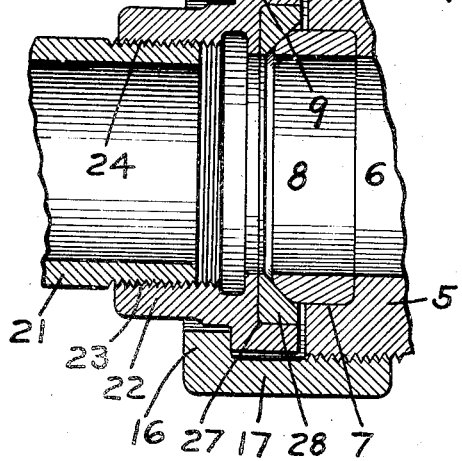

In the accompanying drawings; Fig. 1 is a section showing the manner of coupling one form of pipe to the outlet openings or conduit of a machine; and Fig. 2 is a view similar to Fig. 1 showing the manner of coupling another size and different type of pipe to the same outlet passage.

Interchangeable couplings of the character herein described can be used to couple either brass and other pipes having flared or conical ends to the outlet openings of air compressors, engines, or other machines or devices, or to couple other kinds of pipes of different diameters to the outlet openings.

Referring to the drawings, the member 5, which may illustrate a portion of an air compressor or other engine or machine has a passage or conduit 6 which is enlarged at the face of the member 5 to provide an annular groove or recess 7.

Mounted in the groove 7 is a seat ring 8 having an inner diameter corresponding substantially to the diameter of the passage 6, so that when the parts are assembled together the mouth of the passage will have a uniform diameter.

The outer edge of the ring 8 projects beyond the face of the member 5, and this portion of the ring is formed with an arcuate circumferential surface which provides a seat 9 for the end of the pipe.

When a pipe 10 (see Fig. 1) having an internal diameter less than the diameter of the passage 6 is to be coupled to the member 5, the end of the pipe is flared outwardly to provide an enlarged conical seat 11 which is adapted to bear against the seat 9.

Encircling the pipe 10 is a collar or thimble 12 having an interior surface corresponding substantially in form to the exterior of the end portion of the pipe. The collar 12 has a skirt 13 for embracing the portion of the pipe to the rear of its flared end.

The front portion of the collar 12 is enlarged to provide a rim or flange 14, which rim is, on one side, grooved to provide a seat 15 for the inwardly extending flange 16 of a gland or nut 17.

The portion of the nut 17 on the side opposite to the flange 16 is internally screw-threaded at 18 for engaging the screw-threads 19 formed on the exterior of the member 5.

When the pipe 10 is being fastened to the member 5 and with the flange 16 of the nut 17 embracing the collar 12, the end of the pipe is brought into alinement with the passage 6, the seat 11 of the pipe being positioned squarely against the seat 9 of the ring 8. The nut 17 is now turned so as to draw the end of the pipe tightly against the seat ring 8, thereby effectually sealing the joint between the pipe and the ring 8.

Referring now to Fig. 2, when a pipe 21, having an internal diameter corresponding approximately to the diameter of the passage 6 of the member 5, is to be connected to the member, the pipe is provided with a collar 22 which is interiorly screw-threaded at 23 for mounting on the screw-threaded portion 24 of the pipe 21.

The collar 22 has a rim or flange 25, which rim is, on one side, grooved to provide a seat 26 for the inwardly extending flange 16 of the nut 17 heretofore referred to. The side of the rim 25 opposite to the portion 26 is formed with an annular groove or recess 27 in which is mounted a ring 28. The ring 28 has an internal beveled face 29 to provide a conical seat for engaging the seat 9 of the ring 8 in a manner similar to that in which the portion 11 of the pipe 10 engages this seat of the ring 8.

It will be noticed that either form of pipe can be coupled to the member 5 without the necessity of substituting another ring for the ring 8, or another securing member for the nut 17. Furthermore, the mouths of the pipes are provided with conical seats for engaging the seat 9 of the ring 8, and in both instances the flange 16 of the nut engages a shoulder formed on a collar, so that when the threads of the nut are engaged with the threads of the member 5 and the nut turned, the collar will be drawn towards the member, thereby forcing the conical pipe seat tightly against the seat ring to seal the joint therebetween.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

A pipe coupling comprising a member provided with an opening which is enlarged at the face of the member to provide a rectangular recess, a seat ring mounted in said recess and projecting beyond the face of the member, said seat ring having an arcuate contact face on the outer face thereof, the seat ring and the member constituting a unitary structure whereby the coupling is made interchangeable for use with different types of pipes, a pipe section adapted to be coupled to said member and having an internal conical seat at its mouth for engaging the arcuate face of said seat ring, a collar encircling the pipe section, said collar having an out-turned flange, and a nut threaded to the member and having an inturned flange for embracing the flange of the collar.

In testimony whereof I have hereunto set my hand, this 22nd day of November, 1928.

ELLIS E. HEWITT.